J. W. COX.
STEERING MECHANISM FOR TRUCKS.
APPLICATION FILED MAY 15, 1918.

1,296,927.

Patented Mar. 11, 1919.

Inventor
John W. Cox

By

H. L. Lord
Attorney

UNITED STATES PATENT OFFICE.

JOHN W. COX, OF ERIE, PENNSYLVANIA, ASSIGNOR OF ONE-FOURTH TO GEORGE R. METCALF AND ONE-FOURTH TO EDWARD E. WALKER, BOTH OF ERIE, PENNSYLVANIA.

STEERING MECHANISM FOR TRUCKS.

1,296,927.     Specification of Letters Patent.     Patented Mar. 11, 1919.

Application filed May 15, 1918. Serial No. 234,583.

*To all whom it may concern:*

Be it known that I, JOHN W. COX, a subject of the King of Great Britain, having declared my intention of becoming a citizen of the United States, residing at Erie, in the county of Erie and State of Pennsylvania, have invented new and useful Improvements in Steering Mechanism for Trucks, of which the following is a specification.

This invention relates to steering mechanisms for trucks and consists in certain improvements in the construction thereof as will be hereinafter fully described and pointed out in the claims.

The invention is particularly designed for platform trucks wherein there is a vertical steering post with which the steering handle is connected. Difficulty has been experienced with relation to the means for communicating the motion of the handle to the post and the object of the present invention is to obviate this difficulty.

The invention is illustrated in the accompanying drawings as follows:—

Figure 1:
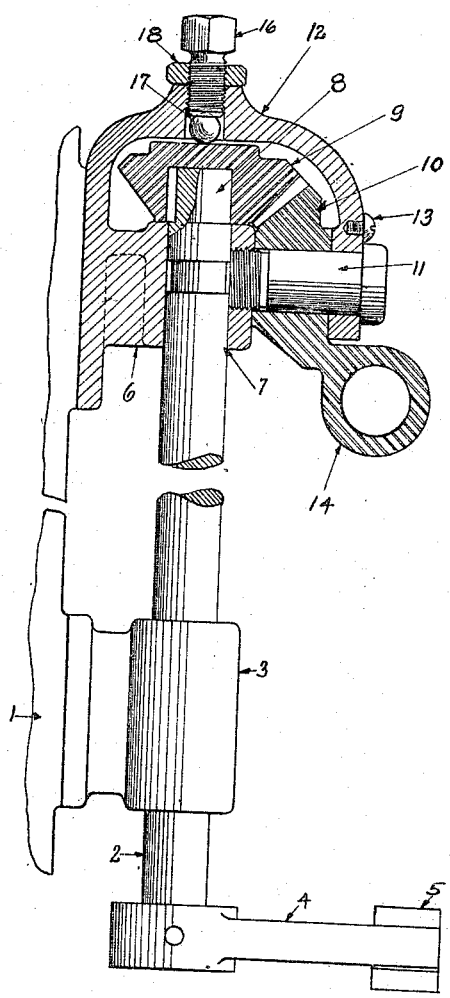
Figure 2:
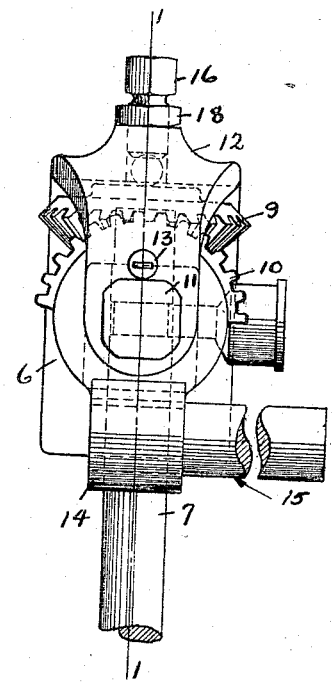

Figure 1 shows a steering post with the handle mechanism in section on the line 1—1 in Fig. 2.

Fig. 2 a side elevation of the handle connection.

1 marks the truck frame, ordinarily an upright portion of the frame, 2 a steering post, 3 a lower bearing for the steering post, 4 a steering arm and 5 a steering link conveying the movement of the arm to the parts of the truck to be actuated for steering.

The bearing 6 is secured to the frame near the upper end of the post and has a journal opening 7 for the post. The post is provided with a squared end 8 on which is arranged a beveled pinion 9. The beveled pinion 9 meshes with a beveled pinion 10 journaled on the pin 11. The pin 11 is screwed into the outer face of the bearing 6. The bearing has an extension 12 extending over the gear 9 and to the outside face of the gear 10. The pin 11 extends through this extension, the extension forming a support for the pin and a thrust bearing for the gear 10. A screw 13 is utilized to lock the pin 11 in place. A lug 14 is arranged on the gear 10 and a steering handle 15 is secured in the lug 14.

In order to form a thrust bearing for the gear 9 a screw 16 is arranged in the upper part of the extension 12 and operates against a ball 17, the ball resting on the upper end of the gear 9. A jam nut 18 is provided for locking the screw 16 in adjustment.

The operation of the mechanism is as follows:— The operator by moving the steering handle 15 upwardly or downwardly rocks the gear 10 and this operating through the gear 9 moves the posts 2 and consequently swings the steering arm 4 as desired.

The gears in this construction are subjected to very severe strain by reason of the strain delivered to the steering post through the steering arm and great difficulty has been experienced heretofore in maintaining a proper connection between the steering handle and the post. With the present construction involving a complete support for the outer pin 11 and also thrust bearings for the gears these difficulties are entirely obviated.

What I claim as new is:—

1. In a steering mechanism for trucks, the combination of a truck frame; a steering post; steering connections actuated by the post; a beveled post pinion on the upper end of the post; a beveled handle pinion meshing the post pinion; a handle extending from the handle pinion; a bearing for the post secured to the frame; a bearing pin for the handle pinion; and an extension from the bearing in supporting engagement with the pin at the side of the handle pinion away from the post.

2. In a steering mechanism for trucks; the combination of a truck frame; a steering post; steering connections actuated by the post; a beveled post pinion on the upper end of the post; a beveled handle pinion meshing the post pinion; a handle extending from the handle pinion; a bearing for the post secured to the frame; a bearing pin for the handle pinion; and an extension from the bearing in supporting engagement with the pin at the side of the handle pinion away from the post, said extension forming a thrust bearing for the handle pinion.

3. In a steering mechanism for trucks, the combination of a truck frame; a steering post; steering connections actuated by the post; a beveled post pinion on the upper end of the post; a beveled handle pinion meshing the post pinion; a handle extending from the handle pinion; a bearing for the post secured to the frame; a bearing pin for the handle pinion; and an extension from the bearing in supporting engagement with the pin at the side of the handle pinion away from the post, said extension forming a thrust bearing for the post pinion.

4. In a steering mechanism for trucks, the combination of a truck frame; a steering post; steering connections actuated by the post; a beveled post pinion on the upper end of the post; a beveled handle pinion meshing the post pinion; a handle extending from the handle pinion; a bearing for the post secured to the frame; a bearing pin for the handle pinion; and an extension from the bearing in supporting engagement with the pin at the side of the handle pinion away from the post, said extension forming thrust bearings for said pinions.

In testimony whereof I have hereunto set my hand.

JOHN W. COX.

Copies of this patent may be obtained for five cents each, by addressing the "Commissioner of Patents, Washington, D. C."